United States Patent [19]

Anderson

[11] 4,018,023

[45] Apr. 19, 1977

[54] CERAMIC ELEMENTS AND INSULATION ASSEMBLY INCLUDING SUCH ELEMENTS

[75] Inventor: Ralph A. Anderson, Niagara Falls, N.Y.

[73] Assignee: The Carborundum Company, Niagara Falls, N.Y.

[22] Filed: July 18, 1975

[21] Appl. No.: 597,109

Related U.S. Application Data

[63] Continuation of Ser. No. 448,791, March 6, 1974, abandoned.

[52] U.S. Cl. .................................. 52/410; 52/508; 85/8.6; 403/289

[51] Int. Cl.² ...................... E04B 1/62; F16B 21/04

[58] Field of Search ............ 52/410, 506, 508, 509, 52/511, 512, 713, 617; 85/8.6; 403/289

[56] References Cited

UNITED STATES PATENTS

| | | | |
|---|---|---|---|
| 505,579 | 9/1893 | Thurston | 403/289 |
| 604,896 | 5/1898 | Garnett | 85/8.6 |
| 2,443,249 | 6/1948 | Jackson | 403/289 |
| 2,640,246 | 6/1953 | Shomber | 85/8.6 |
| 2,862,747 | 12/1958 | Deliso | 403/289 |
| 3,367,694 | 2/1968 | Witt | 52/410 |
| 3,523,395 | 8/1970 | Rutter et al. | 52/508 |
| 3,738,217 | 6/1973 | Walker | 85/8.6 |
| 3,742,670 | 7/1973 | Byrd | 52/410 |

*Primary Examiner*—J. Karl Bell

*Attorney, Agent, or Firm*—David E. Dougherty; Robert C. Weber

[57] ABSTRACT

A ceramic element or fastener is provided for supporting flexible insulation in a furnace of the type designed for high temperature operations. The insulation is supported upon a ceramic element which projects outwardly from a structural supporting member, and retained upon the element by a ceramic washer. The washer is fastened in locking engagement upon the element near its outer end. The base of the element is retained within a metal socket, the base of which is fastened to the support member to provide a firm but non-rigid attachment of the element to the structural supporting member.

2 Claims, 5 Drawing Figures

CERAMIC ELEMENTS AND INSULATION ASSEMBLY INCLUDING SUCH ELEMENTS

This is a continuation of copending application Ser. No. 448,791, filed Mar. 6, 1974, now abandoned.

BACKGROUND OF THE INVENTION

The increased use of high temperature equipment in industry has led to a corresponding increase in the use of suitable insulation which can withstand the high temperatures employed. Conventional high temperature installations such as furnaces, soaking pits, annealing furnaces, etc., are frequently constructed with walls and roofs of refractory brick. This results in a heavy massive structure which must be braced or supported with a suitable metal structure. Construction expenses are high, due to the high cost of the refractory brick needed and the requirement of skilled labor for the proper assembly of the brick. Once assembled, these brick-type constructions, aside from their high cost and weight, are by nature quite rigid and are prone to cracking and breakage, due to mechanical strains set up by thermal expansion. Extended startup heating periods may therefore be required to minimize thermal shock and, if repairs are needed, a long cooling period may be necessary before repairs can be started.

In recent years, the introduction of fibrous insulation materials as replacements for brick linings has considerably improved furnace construction and thermal efficiency while also reducing the costs of construction and permitting faster heating and cooling cycles without any damage by thermal shock. Fibrous insulation is now available which can withstand furnace temperatures ranging as high as 2300° to 2700° F. As an example, a furnace construction system of this type is described in U.S. Pat. No. 3,523,395, in which fibrous insulating materials are fastened to the interior walls of a high temperature chamber by means of composite metal and refractory pins, the insulation being retained on the pins by suitable washers engaging the heads of the pins. While other similar systems are known and have been satisfactory in the initial stages of furnace operation, the problem remains of providing an insulation attachment means that will provide continuous positive support despite any slow shrinkage of the fibrous insulation during extended periods of furnace operation. An attachment means which will withstand the heat of the furnace for extended periods and yet retain the insulation in place, regardless of the effects of insulation shrinkage or furnace wall vibration, is therefore desirable.

SUMMARY OF THE INVENTION

The invention relates to a removable and replaceable support element or fastener for fastening flexible high temperature insulation to the interior surface of a furnace or the like, and to an insulation assembly for use in furnace construction in which a structural supporting member such as a furnace wall is protected by one or more layers of insulation material. The invention comprises the use of a removable and replaceable, unitary ceramic pin having an annular grooved outer end portion and an inner end or base portion, and a ceramic washer with openings for insertion over the pin and for removable locking engagement thereon for the firm retention of the layers of insulation material impaled upon the pin. The base portion of the ceramic pin is removably supported by insertion in a slitted metallic pin socket, the base of the socket being attached to a supporting member. The socket provides a firm but non-rigid supporting means for the ceramic pin and the locking ceramic washer retains its engagement with the outer portion of the pin, thereby holding the insulation in place on the pin between the furnace wall and washer, even during extended periods of high temperature operation.

DESCRIPTION OF THE PREFERRED EMBODIMENTS

Figure 1:
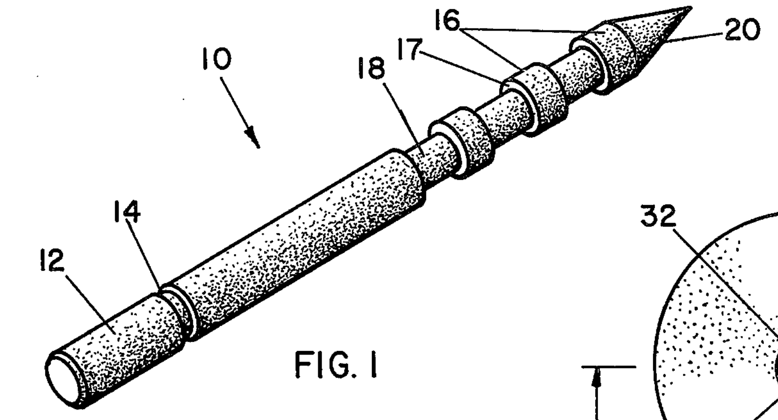
FIG. 1 shows an isometric view of a ceramic pin.
Figure 2:
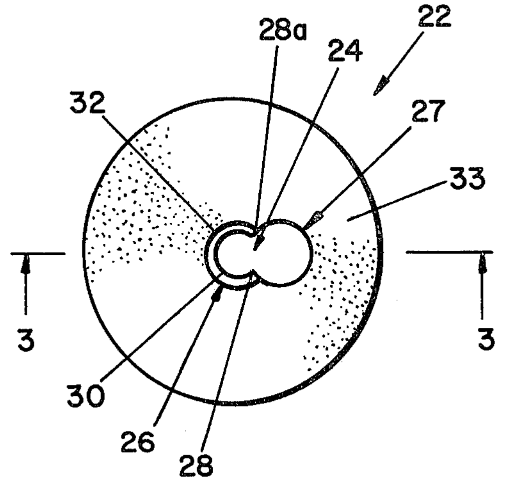
FIG. 2 shows a top view of a ceramic washer.
Figure 3:
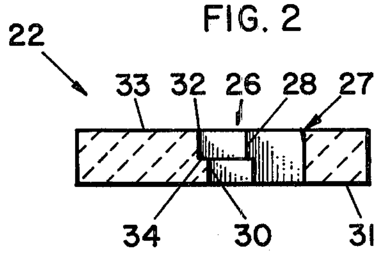
FIG. 3 shows a section side view of the ceramic washer.

The support element or fastener of the invention comprises a cylindrical ceramic pin, shown generally at 10 in FIG. 1. The pin has at one end an inner base portion 12 and at the other end a grooved outer portion 16, the portion 16 having one or more broad annular grooves 18, forming one or more reduced parts and external annular pin shoulders 17. The grooved portion 16 terminates in a point 20. The grooves 18 function as recesses for engaging a corresponding aperture 24 in a flat ceramic washer, shown generally as 22 in FIGS. 2 and 3. The washer 22 has an upper surface 33 and a lower surface 31. While the washer is preferably circular, it is not restricted to this shape, but may be square, oblong or multi-sided if desired. The washer defines or includes an aperture, shown generally as 24, including or defining two contiguous and generally circular, but specifically greater than semi-circular openings or holes, 26 and 27. The first opening shown generally at 26, is preferably located at the axial center of the washer but may be off-center if desired. The second opening, shown generally at 27, is preferably located in off-center position in the washer and is contiguous to the first opening 26, the openings having intersecting sides in common at 28 and 28*a*. The second opening, 27, has a diameter which is large enough to allow the ready insertion therein of the pin 10. The first opening 26, consists of a lower or inner portion or part 30 and an upper or outer portion or part 32, the upper portion formed by countersinking from the surface 33 in axial relationship with lower portion 30. The portion of opening 26 which passes entirely through the washer 22 has a diameter which is smaller than the diameter of the pin 10, but larger than the diameter of the reduced parts formed by grooves 18. The countersunk upper portion of opening 26 forms an internal and outwardly facing, greater than semi-circular shoulder 34 within the opening 26, as shown in FIG. 3.

The ceramic washer 22 is engaged upon the pin 10 by first placing the washer over the pointed end 20 and sliding the washer along the pin, the pin entering the washer through the opening 27. For proper engagement of the washer with any one of the inwardly facing external shoulders 17 formed by pin grooves 18, the pin must enter from the lower surface 31 of the washer 22. The washer is then moved along the pin axis until the opening 26 is in line with any one of the reduced parts formed by broad annular grooves 18, the washer is then moved sideways to position the groove 18 within the lower portion 30 of the opening 26. The washer should preferably be positioned so that the opening 27 is below the opening 26. A slight reverse axial movement of the washer then forms contact with the washer shoulder 34 removably engaged against any one of the external and inwardly facing, annular pin shoulders 17, with portion or part 32 partially surrounding and removably engagable with any one of the three ungrooved parts of outer end portion 16, such as the outermost part shown in FIG. 4. The pin portion 16 is thus held within the upper portion 32 of the opening 26. The washer may be rotated upon the pin but cannot move sideways since the opening defined by or the spacing separating the intersections 28 and 28*a* is larger than the diameter of the reduced parts but smaller or less than the larger diameter of the three ungrooved parts of the pin outer end portion 16. The washer therefore provides an improved retaining means for insulation which is impaled upon the ceramic pin, the washer retaining its engagement with the pin, even under the combined effects of mechanical vibration, high temperature and insulation movement. The washer may be removed only by manually pushing it back, against the pressure of the insulation behind it, and then sliding it sideways into the second opening 27 to release it from engagement with the pin portion 16.

Figure 4:
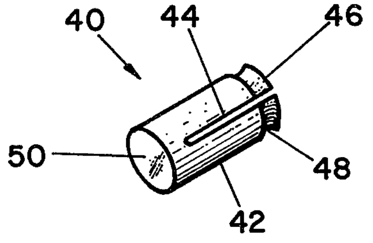
FIG. 4 shows an isometric view of a metallic pin socket.

The base portion 12 of the ceramic pin 10 is held in position against a structural supporting member by engagement within a circular or cylindrical pin socket, shown generally as 40 in FIG. 4. This is a thin walled, cup shaped socket of metallic composition, preferably steel. The socket 40 has a base 50 and the cylindrical socket wall 42 defines an open ended enclosure of sufficient internal diameter for slidably engaging over the base portion 12 of the ceramic pin 10. The base portion 12 has a shallow annular groove 14 formed therein to assist in the retention of the pin within the socket 40, by engagement therein of interior arcuate lips 48 in the socket. The wall 42 has one or more longitudinal slits 44 cut through the wall from the open end of the socket, the slits dividing the wall into segments, thus allowing a limited degree of elastic sideways movement for the wall when the base portion 12 of the pin 10 is inserted within the socket 40. The open outer end 46 of the socket has interior arcuate lips 48 formed in the wall segments, these lips providing a removable locking engagement or snap fit of the lips in shallow annular groove 14 on the base or inner end portion 12 when the ceramic pin 10 is inserted within the socket. The socket base or inner end 50 may be secured to a structural supporting member by welding, bolting, cementing, or other suitable techniques. While the socket base 50 is preferably closed, the socket construction is not limited to this but may have an open base or a base with an outwardly extending radial flange.

Figure 5:
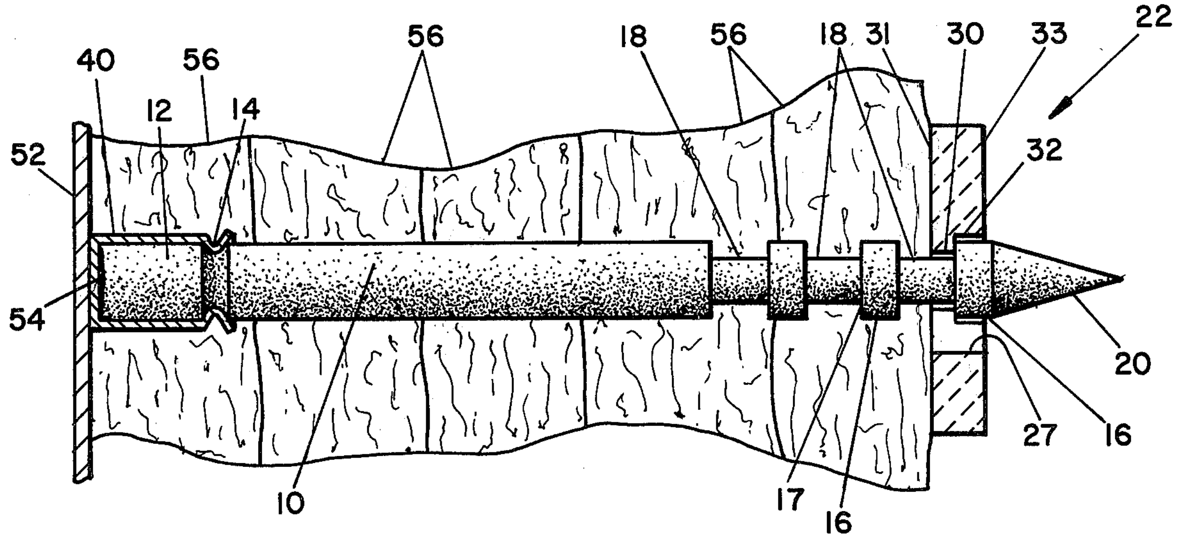
FIG. 5 shows a sectional side view of a part of an insulated wall surface, showing the function of the combined socket, pin and washer for holding the insulation materials in place.

The improved insulation construction of the invention is shown in sectional view in FIG. 5 wherein the structural supporting member 52, e.g., an outer metal furnace wall, supports the pin socket 40, the base of the socket being attached to member 52 by welding at 54. The base portion 12 of pin 10 is inserted and retained within socket 40, the pin 10 then functioning as a support for layers of fibrous insulation 56 which are impaled thereon. The wall of insulation 56 is then held firmly in place by placing the ceramic washer 22 over the head 20 of the pin and pressing the insulation back until the washer 22 engages one of the annular grooves 18, whereupon the washer is shifted as described earlier into locking engagement with the shoulder 17 of the groove 18.

The insulation construction of the invention provides a refractory pin which is firmly attached to its structural supporting member, and yet avoids the kind of rigid attachment which could fail under mechanical or thermal stresses. The retention of the ceramic pin within the flexible walls of the pin socket allows a limited amount of sideways pin movement at its outer end 20 without pin breakage, while the locking engagement of the ceramic washer 22 with the pin 10 prevents the loss of the washer even after prolonged exposure to high temperatures, insulation movement during high temperature shrinkage, and mechanical stresses set up between the structural supporting members and the insulation supports. Construction is expedited, since the pin sockets can be quickly attached to the support members and the ceramic pins snapped into place. If required, the pins can be rapidly replaced with pins of differing lengths without removing insulation or changing the pin sockets. Since both pins and washers are ceramic and have no metallic parts or inserts, they are unaffected by prolonged direct exposure to furnace atmospheres, even at high temperatures, and resist thermal shock under conditions of fluctuating temperatures, as well as mechanical stresses set up by furnace vibration.

As an example of the effectiveness of this insulation construction, a set of ceramic pins and washers were prepared for testing in a high temperature furnace. The pins were extruded from a wet mixture comprising finely divided alumina, mullite and kaolin clay, an aqueous solution of alkophos C being used as a binding agent. This binding agent is a colloidal aluminum phosphate, the aqueous solution comprising a mixture of aluminum phosphate and phosphoric acid. (Alkophos C is a registered trademark of Monsanto, St. Louis, Mo.). After extrusion, the pins were air dried for 2 hours, followed by overnight oven drying at 300° F. After an additional hour's firing at 600° F, the pins were strong enough to permit machining to the general configuration as shown in FIG. 1. They were then fired at 2000° F for 5 hours to attain their maximum strength and hardness. The washers were prepared from a ceramic mixture of similar composition which was pressed in a mold to the general shape shown in FIGS. 2 and 3, dried at 300° F and fired at 2000° F for 5 hours.

To secure the pins in place, the metal pin sockets 40 were first attached to a metal test panel by welds at the bottom of each socket. The bases of the pins 10 were then pushed into the sockets and blankets of fibrous insulation were impaled over the points of the projecting pins, the insulation being pushed back in firm contact with the metal test panel. Several layers of insulation were added, the outer surface of the top layer being about an inch below the pointed tips of the ceramic pins. The ceramic washers were then placed over the pins and pushed in against the insulation to permit locking engagement with the pin grooves. The insulation used was fibrous aluminum silicate, this ceramic fiber being effective for prolonged service at temperatures as high as 2600° F. This fiber is available from The Carborundum Company, of Niagara Falls, New York, under the trademark Fiberfrax H. The test panel insulation assembly was made part of a furnace wall and the furnace heated at 2600° F for 10 days, after which time it was cooled for examination of the insulated test panel. Although there was a slight shrinkage of the insulation, it was still held in firm attachment to the test panel by the ceramic pins and washers, which showed little change after the prolonged heating period. Both pins and washers comprise ceramics having softening or melting points considerably higher than the temperature used. The results of this test therefore indicate that they would retain their effectiveness as insulation retainers indefinitely unless the designated furnace temperature was greatly exceeded.

It should be noted that because of the excellent heat insulating characteristics of the supported wall of refractory fibrous insulation, the temperature at the outer furnace wall 52 will generally not exceed about 400° F. At such reduced temperature, there are no deleterious structural effects on the welds holding the sockets on the furnace wall or on the resiliency of the socket segments which retain the ceramic pin 10. It will also be obvious that multiple annular grooves 18 are provided on the ceramic pin 10 so that the ceramic washer 22 can be positioned axially along the pin 10 to accommodate walls of fibrous (flexible) insulation of different overall thickness.

I claim:

1. A high temperature furnace insulation assembly including, in combination with a furnace wall and a body of flexible insulation material, a fastener supporting said body on said furnace wall, wherein the improvement comprises: said fastener including a socket attached at its inner end to said furnace wall; a removable and replaceable, unitary ceramic pin inserted into said socket and over which pin said body is impaled, and a ceramic washer holding said body in place on said pin between said furnace wall and said washer; said pin having an inner end portion provided with an annular groove, and an outer end portion having a reduced part and an external and inwardly facing, annular shoulder; said socket having flexible wall means slid over said inner end portion and provided at the outer end of said socket with interior lip means snap fit into said groove, and a ceramic washer moved on said outer end portion and including an aperture defining two intersecting through openings having intersections separated by spacing larger than said reduced part but smaller than said outer end portion, with one of said openings being larger than said outer end portion, and the other of said openings being alignable with said reduced part and including an inner part larger than said reduced part but smaller than said outer end portion, an outer part larger than and removably engagable with said outer end portion, and an internal and outwardly facing, greater than semi-annular shoulder removably engaging said external shoulder.

2. The assembly of claim 1 wherein said ceramic pin is cylindrical and said outer end portion has annular grooves forming reduced parts and external and inwardly facing, annular shoulders; said socket is cylindrical and has flexible wall segments slid over said inner end portion and provided at the outer end of said socket with interior arcuate lips snap fit into said groove; said openings are greater than semi-circular, said other opening is alignable with any one of said reduced parts, and said internal shoulder is removably engaged with any one of said external shoulders.

* * * * *